W. W. RHODES.
METHOD OF HYDRATION.
APPLICATION FILED SEPT. 27, 1916.
1,318,921.
Patented Oct. 14, 1919.
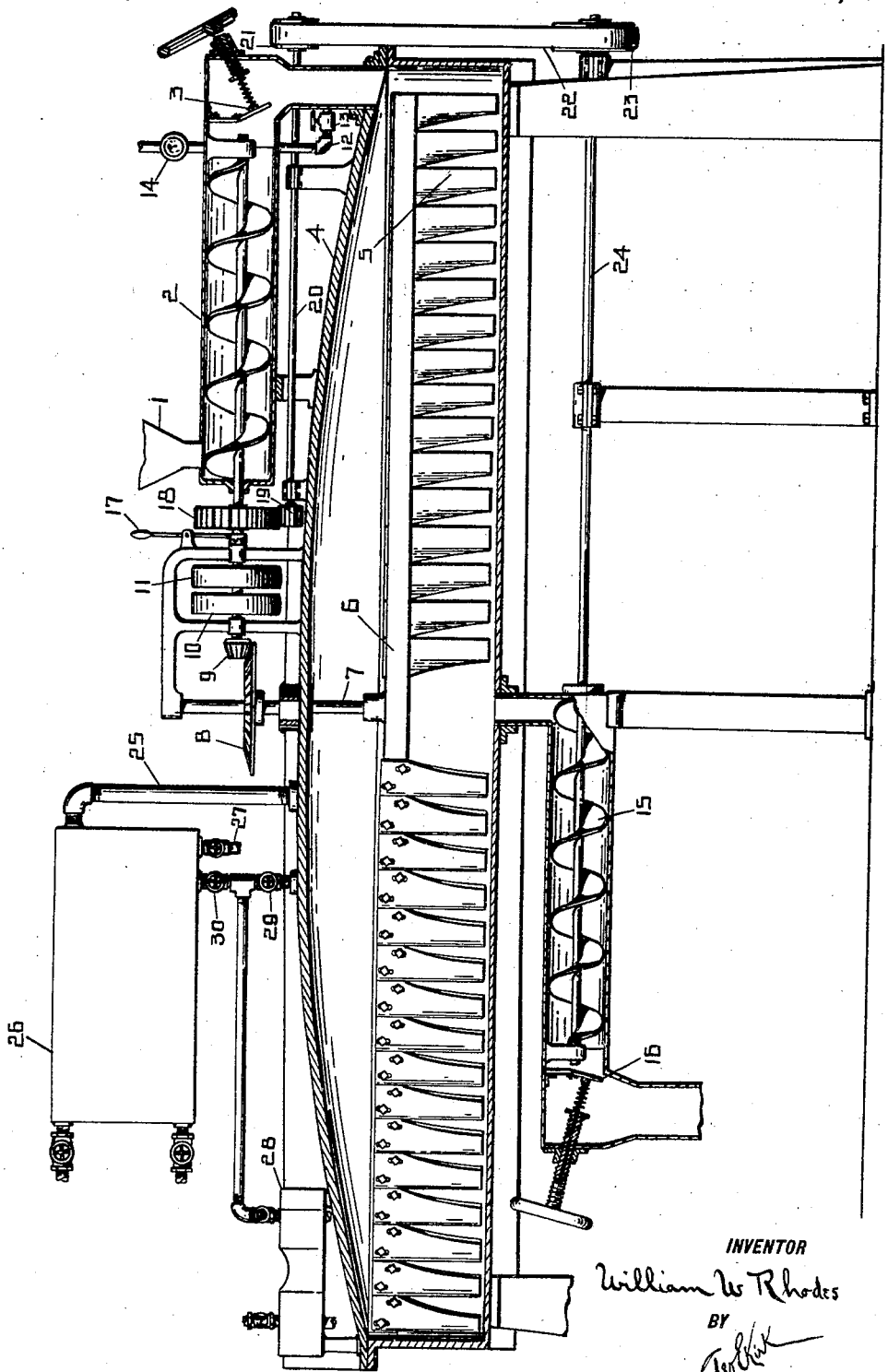
INVENTOR
William W Rhodes
BY
ATTORNEY

UNITED STATES PATENT OFFICE.

WILLIAM W. RHODES, OF WOODVILLE, OHIO.

METHOD OF HYDRATION.

1,318,921.  Specification of Letters Patent.  Patented Oct. 14, 1919.

Application filed September 27, 1916. Serial No. 122,366.

*To all whom it may concern:*

Be it known that I, WILLIAM W. RHODES, a citizen of the United States of America, residing at Woodville, Sandusky county, Ohio, have invented new and useful Methods of Hydration, of which the following is a specification.

This invention relates to definitely proportioning or chemically combining of substances.

This invention has utility, especially in hydrations, being more particularly adapted to alkali earths, as calcium and magnesium containing substances.

The calcined or quick material may be slaked hereunder effectively and uniformly very readily by the supply of an excess of moisture, and, in the treatment hereunder with a finished product fully hydrated, the excess moisture may be eliminated during the treatment, thereby leaving a product readily placed in commercial shape without mechanical difficulties, such as subsequent drying or other treatments.

In the operations hereunder with excess moisture, quick lime, magnesium oxid, isolated or variously associated, or in connection with other substances, may be introduced into a receiver or container, even by continuous and so preferred process. This container is air-trapped to permit the reduction of pressure therein. In this continuous operation there is to advantage more or less agitation of the material for exposing the particles to a low pressure medium. In this excess supply of water to the oxids exothermic reaction occurs or chemical combination in the hydrate. As the production of the oxid is an endothermic reaction, the stability or maintenance of the exothermic reaction product against reversion is rendered more certain by effective avoidance of temperature rise, especially in any regions of isolation. This stability is attained by lowering the pressure in the receiver.

Such alkalis, if generating heat baked kernels or clods undisturbed at atmospheric pressure may, notwithstanding the excess moisture, cause a reversion back to the oxid. This is especially the case in treatments wherein calcium and magnesium are associated, with the violence of the calcium reaction tending to overcome the less strong valences of the endothermic magnesium hydrate, if not in some instances actually causing the reversion to affect some of the calcium. The presence of these oxids interferes with the plasticity of the mortar material and has the still greater commercial objection of weather reaction or reversion to the hydrate state after embodied in the mortar structure. This introduces a defect of great seriousness and a source of weakness in the masonry structure, joint, or wall finish.

In the drawing off the air simultaneously with the commencement of hydration upon initiation of the process and running, condensing or vacuum during operation there is resultant water evaporation at a lower temperature from the exothermic reaction. This cooler vapor or steam has greater penetration than the water and accordingly seeks out its affinities of the oxids for thorough hydration with a reduced interference due to removal of the inactive air gases. The hydration is accordingly promoted and the continuation of the exothermic reactions vaporizes the excess moisture for removal by the low pressure maintaining means, as vacuum pumps and condensers. This increased permeability, notwithstanding the speed and thoroughness of hydration, occurs at a lower temperature. The latent heat of the lower pressure steam is more remote from the endothermic point at which reversion to oxid may occur. Thus there is given increased stability to the hydrates for exclusion of return to oxids. Excess moisture insures complete hydration, but in the vacuum this excess of 40 to 100% of moisture for hydration is removed to leave a dry hydrate.

These reactions occuring independently of the retarding atmospheric influence, further produce a product superior in its increased density, apparently attributable to the absence of inactive fluids of the air. This more dense dry powder or subdivided material is of greater plasticity in use, requires less water to produce the putty or mortar, and in the subsequently set structure has a density of texture and firmness improving the mass, joint or wall, giving it added strength against checking.

The theory that the exothermic reaction in the hydration of calcium oxid has the tendency to cause a reversion or endothermic reaction as to magnesium hydroxid before a reversion in the calcium hydroxid, is given substantiation in the heats of formation, considering the heat of formation at 15° centigrade as a solid of calcium oxid to be 131,500 calories; that of calcium hydroxid to be 215,600 calories; there is the difference of heat of formation for the hydroxid from the oxid of 84,100 calories. Considering the magnesium oxid heat of formation as 143,400 calories; that of magnesium hydroxid to be 217,800 calories, there is the difference, as the exothermic heat of formation of magnesium hydroxid from oxid, of 74,400 calories.

With like amount of energy required for reversion, it is to be noted nearly 10,000 calories, or about one-eighth less heat energy is required to revert the magnesium hydroxid to the oxid than is required for changing calcium hydroxid to calcium oxid.

Accordingly, in carrying out the process hereunder, the calcined or quick mass, more or less subdivided, is combined with water of a proportionate quantity about 40% to 100% in excess of that sufficient to hydrate fully the calcium and magnesium oxid, depending upon the proportion of calcium oxid and magnesium oxid occurring therein and to the temperature and character of the burning. Preferably simultaneously with this addition of water which may take place as a continuous process, the air is removed to lower the vapor tension of the material envelop. In the maintenance of this lowered vapor tension, excess moisture in the shape of steam generated in the hydration is taken off to complete the treatment in the production of an air-free dry powder of subdivided mass.

In carrying out the invention herein disclosed, there may be used the apparatus of the accompanying drawings.

The subdivided material, as calcium and magnesium containing oxids may be supplied from hopper 1 to the scroll conveyer 2 to force open the adjustable gate 3 in the travel of the material to the hydration chamber 4, wherein it may be distributed and progressed by the paddles or plows 5 carried by the radiating arms 6 rotated by the shaft 7 through the bevel gearing 8, 9, as actuated from the live pulley 10 when the belt is shifted thereon from the loose pulley 11. In the supply of material to be hydrated to the chamber 4, there is coincident water supply from the line 12, with flow regulated by the valve 13, while the volume is disclosed by the meter 14.

The hydration agitation and progress of the material about the chamber 4, works such material toward the center for discharge to the scroll conveyer 15 having the adjustable discharge resisting gate 16 therefrom.

The hand lever 17 may be operated to effect driving of the conveyer 2 from the pulley 10 for charging material into the chamber 4. Simultaneously the gear 18, in mesh with the pinion 19 drives shaft 20, pulley 21, belt 22, pulley 23 and shaft 24 actuating the conveyer 15. Therefore, in batch operation, there may be emptying of a hydrated charge from the chamber 4 at the same time a new supply is forced into the chamber 4.

During the hydration, the inert gases of the air and the excess moisture may be withdrawn through the line 25 from the chamber 4 to the condenser 26 with discharge therefrom through the line 27. For more rapid condensation, as well as pulling greater vacuum on the chamber 4, the pump 28 may be connected directly to the chamber 4 as permitted by the valve 29, or the pump and condenser may be in series as permitted by the valve 30. This withdrawal of moisture surplus, by rarefying the medium in the chamber 4, leaves the residual medium more closely approximating a true gas for effective hydration penetration into the distributed material, while further lowering the temperature in maintaining cooler reaction regions.

What is claimed and it is desired to secure by United States Letters Patent is:—

1. The process of hydrating an alkali earth oxid comprising maintenance of steaming of the oxid with such steam enveloping the mass as steam at a temperature below one hundred degrees centigrade.

2. The process of hydrating quick lime comprising the subjecting thereof to maintained steaming while maintaining the enveloping pressure below one atmosphere.

3. The process of chemically combining moisture with an alkaline earth substance having exothermic reaction with such moisture, comprising maintaining the moistened substance at a temperature below the atmospheric steaming temperature of water while steam is being generated therefrom.

4. The process of hydrating alkine material comprising subjecting the material to water in excess of the combining quantity for hydration, and the reduction of such excess by maintaining the reaction in vacuum and drawing off the moisture as vapor.

5. The process of treating magnesia-containing lime comprising subjecting it to such an excess of water in a vacuum that the evaporation of the excess water will remove the heat set free by hydration of the calcium oxid to such an extent that the heat will not cause reversion of the magnesium oxid hydration reactions.

6. The process of treating a mixture of substances capable of direct union with water, one of which might set free, by its hydration, so much heat as to interfere with the hydration of other components of the mixture, comprising subjecting the mixture to an excess of water in a vacuum.

7. The process of chemically combining moisture with a substance having exothermic reaction in combination with water comprising lowering the temperature during the combining by maintaining the moisture at less than atmospheric pressure and in excess quantity, and simultaneously drawing off excess low temperature moisture as a vapor with the pressure maintained below atmospheric pressure and the temperature below the vaporizing point for steam at atmospheric pressure.

8. The process of hydrating an alkaline earth comprising the mechanical agitation of a subdivided mass of its oxid, the exclusion of inactive air therefrom, the supply of excess moisture, and, with the maintenance of reduced pressure, the removal of excess moisture as steam and the keeping of the temperature down below 212° F.

In witness whereof I affix my signature.

WILLIAM W. RHODES.

Copies of this patent may be obtained for five cents each, by addressing the "Commissioner of Patents, Washington, D. C."

It is hereby certified that in Letters Patent No. 1,318,921, granted October 14, 1919, upon the application of William W. Rhodes, of Woodville, Ohio, for an improvement in "Methods of Hydration," errors appear in the printed specification requiring correction as follows: Page 2, claim 4, line 107, for the word "alkine," read *alkaline;* same page, claim 7, line 130, for the word "combination" read *combining;* and that the said Letters Patent should be read with these corrections therein that the same may conform to the record of the case in the Patent Office.

Signed and sealed this 11th day of November, A. D., 1919.

[SEAL.]

M. H. COULSTON,
*Acting Commissioner of Patents.*

Cl. 222—4.